United States Patent [19]
Kato et al.

[11] Patent Number: 5,909,815
[45] Date of Patent: Jun. 8, 1999

[54] SINGLE DRIVE, MULTI-SCREW SORTER WITH PUSHER MEANS

[75] Inventors: Heizaburo Kato, Ogasa-gun; Osamu Kojima, Fujioka, both of Japan

[73] Assignees: Sankyo Manufacturing Co., Ltd.; Eisai Co., Ltd., both of Tokyo, Japan

[21] Appl. No.: 08/973,999

[22] PCT Filed: May 1, 1997

[86] PCT No.: PCT/JP97/01500

§ 371 Date: Dec. 12, 1997

§ 102(e) Date: Dec. 12, 1997

[87] PCT Pub. No.: WO97/41974

PCT Pub. Date: Nov. 13, 1997

[30] Foreign Application Priority Data

May 2, 1996 [JP] Japan .................................... 8-111758

[51] Int. Cl.[6] .............................. B07C 9/00; B07B 13/05
[52] U.S. Cl. ...................... 209/653; 209/659; 209/660; 209/913; 209/651
[58] Field of Search .................................. 209/651, 653, 209/659, 660, 913

[56] References Cited

U.S. PATENT DOCUMENTS

1,737,438  11/1929  Stearns ...................................... 209/913
3,089,593  5/1963  Honnert .................................... 209/913

*Primary Examiner*—William E. Terrell
*Assistant Examiner*—Joe Dillon, Jr.
*Attorney, Agent, or Firm*—Morrison & Foerster

[57] ABSTRACT

The present invention is a sorter for products conveyed successively and continuously. The sorter components include a main screw rotated continuously by a drive shaft to arrange in order and convey products to be sorted. The main screw has helical grooves for engagement with the products and an annular groove portion for stopping therein each of the to-be-sorted products. The annular groove portion is positioned between helical grooves of the main screw. A rotatable sub-screw with helical grooves is located near the main screw at the annular groove portion for engagement with the products to be sorted. The sorter further includes a delivery means disposed at the annular groove to deliver the products from the main screw to the sub-screw and an interlocking mechanism rotating off the drive shaft which synchronizes the delivery means with the sub-screw. This sorter is a high speed, reliable system for sorting products undamaged.

18 Claims, 6 Drawing Sheets

SINGLE DRIVE, MULTI-SCREW SORTER WITH PUSHER MEANS

TECHNICAL FIELD

The present invention relates to a sorter for automatically sorting products which are conveyed successively and continuously.

BACKGROUND ART

In an automated manufacturing equipment for mass-producing products, the quality of the products is checked to distinguish between non-defective products and defective products, thereby preventing defective products from being distributed to a commodity distribution channel. In particular, with recent mass production of medical supplies and electronic components, there has been a demand not only for the improvement in performance of inspection devices for inspection of those products but also for higher accuracy and higher efficiency of sorters for sorting the products after inspection. Defective medical products affect the human life and this is a serious problem, and defective electronic components if incorporated in an electronic device prevents the electronic device to exhibit its performance to a satisfactory extent. Therefore, it has come to be required that the sorter is capable of sorting mass-produced products efficiently and with strict correctness and reliability to completely prevent inclusion of defective products among non-defective products.

Figure 9:
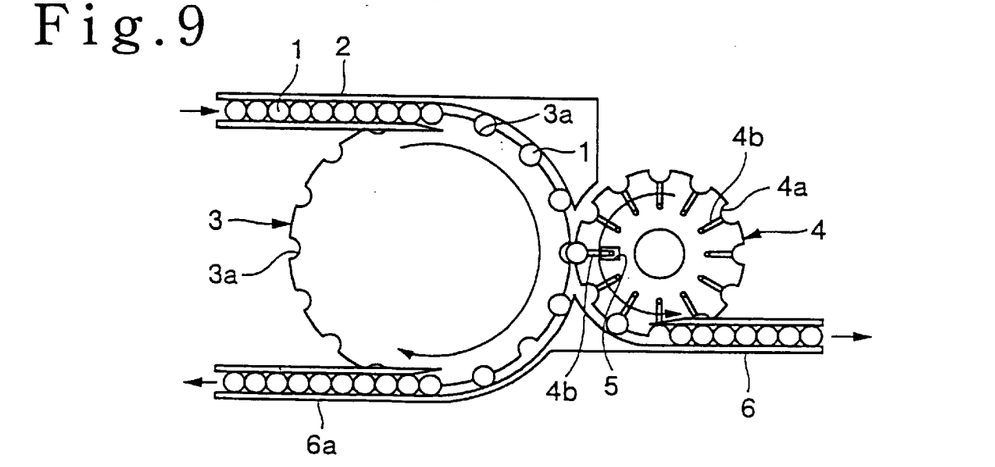
FIG. 9 is a plan view showing an example of a conventional sorter.
Figure 10:
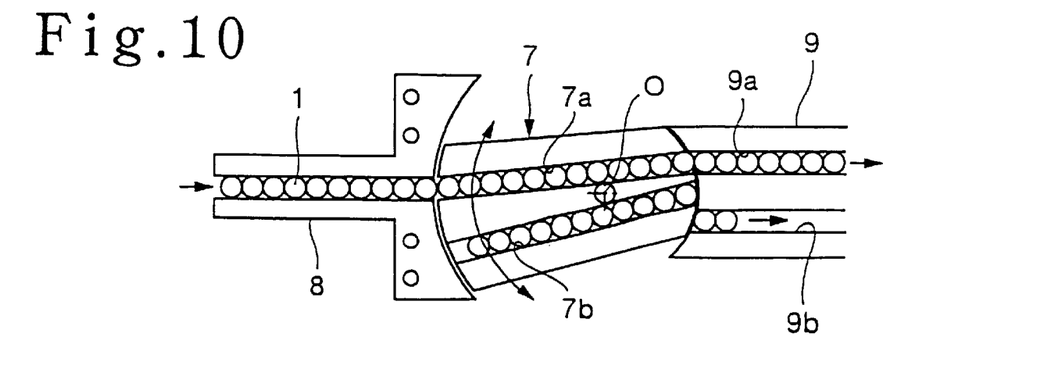
FIG. 10 is a plan view showing another example of a conventional sorter.

Heretofore, as methods for sorting products after inspection into non-defective products and defective products, there have been known such a method using star wheels as shown in FIG. 9 and such a method using a pendulum as shown in FIG. 10.

In the former method using star wheels, as shown in FIG. 9, there are used a product conveying star wheel 3 which rotates while receiving products 1 in recesses 3a formed in its outer periphery, the products 1 being fed through a product inlet guide 2, and a product sorting star wheel 4 which is disposed adjacent the star wheel 3 and which is rotated so that recesses 4a formed in the outer periphery thereof come into alignment with the recesses 3a of the star wheel 3. Further, the recesses 4a of the product sorting star wheel 4 are contiguous to slits 4b for communication with a vacuum passage 5. When a defective product passes the star wheel 4, a negative pressure is generated in the vacuum passage 5 to attract the defective product to the star wheel 4 from the star wheel 3, whereby the defective product is discharged through a defective product discharge guide 6. On the other hand, in the case of a non-defective product, a negative pressure is not generated in the vacuum passage 5, so that the product 1 is conveyed as it is by the star wheel 3 and is sent out through a product outlet guide 6a.

On the other hand, in the latter method using a pendulum, there is used a pendulum 7 which is reciprocated pivotally about a pivot center O. The pendulum 7 is formed with first and second bifurcated passages 7a and 7b centered at the pivot center O. A pair of first and second discharge passages 9a and 9b is formed in a discharge guide 9. The discharge passages 9a and 9b each come into communication with either of the passage 7a or 7b in accordance with a swing motion of the pendulum 7. The pendulum 7 is allowed to swing according to whether each product 1 fed through a feed guide 8 is non-defective or defective, whereby the product 1 is introduced selectively into one of the first and second passages 7a and 7b and is then discharged through the first discharge passage 9a or the second discharge passage 9b.

However, in the conventional sorter using star wheels shown in FIG. 9, since the sorting of products 1 is performed by suction using a negative pressure, there exists an unstable factor relating to the generation and control of a required negative pressure, thus leading to the problem that the sorting operation is less reliable. moreover, the recesses 3a and 4a formed respectively in the outer periphery of the product conveying star-wheel 3 and in the outer periphery of the product sorting star wheel 4 are for receiving and sending out products 1, but since both of the recesses 3a and 4a are spaced a large distance at a certain pitch, it has been likely that at the time of sending out the products 1 through the defective product discharge guide 6 and the product outlet guide 6a and arranging them in order, the products 1 will suddenly approach each other into collision and that the resulting great impact on the products will cause damage to the products.

In the conventional method using a pendulum, which is shown in FIG. 10, since the pendulum 7 swings repeatedly with products 1 contained in its first and second passages 7a and 7b, the products 1 on the pendulum 7 may repeat mutual collision due to the action of repeated centrifugal forces. Also in this point there has been a fear of damage to the products 1. Besides, in the case where the number of products 1 contained in the first and second passages 7a and 7b changes, there is a fear that unevenness may occur in the swing motion of the pendulum 7 due to a change in inertia force associated with the swing motion. Thus, it has been difficult to ensure the stability in high-speed operation.

DISCLOSURE OF INVENTION

The present invention has been accomplished in view of the above-mentioned problems of the prior art and it is an object of the invention to provide a sorter capable of sorting products with strict correctness and reliability and at high speed without causing damage to products.

According to the present invention, in order to achieve the above-mentioned object, there is provided a sorter comprising a drive shaft; a main screw which is rotated continuously by the drive shaft to arrange in order and convey products to be sorted, the main screw having helical grooves for engagement with the products to be sorted; an annular groove portion for stopping therein each of the to-be-sorted products being conveyed, the annular groove portion being formed between the helical grooves of the main screw in series with the helical grooves; a rotatable sub-screw located near the main screw at the position of the annular groove portion, the sub-screw being formed with helical grooves for engagement with the products to be sorted to arrange in order and convey the products; a delivery means disposed at the position of the annular groove portion to deliver the products to be sorted from the main screw to the sub-screw; and an interlocking mechanism to which is inputted the rotation of the drive shaft and which synchronizes the delivery motion of the delivery means with the rotation of the sub-screw.

Preferably, the interlocking mechanism comprises a cam type index device having an input shaft and an output shaft which are driven rotatably, with a continuous rotation of the drive shaft for rotating the main screw continuously being inputted to the input shaft interruptably, and with an intermittent rotation being outputted from the output shaft to control the rotating motion of the sub-screw; and a cam mounted on the input shaft of the cam type index device to output a delivery motion to the delivery means with rotation of the input shaft.

Preferably, on the discharge end side of the main screw and that of the sub-screw, the helical grooves are spaced at a pitch almost equal to the size of each product to be sorted.

Preferably, the delivery means comprises a slit formed in the annular groove portion of the main screw so as to face the sub-screw and a pusher being able to advance and retreat into and from the slit in such a manner that when retreated from the slit the pusher is not projected to the annular groove portion, while when advanced into the slit the pusher is projected to the annular groove portion to push the to-be-sorted product located therein toward the sub-screw.

Preferably, for the transfer of an operating force to the pusher from the cam to reciprocate the pusher, the sorter further includes a first lever having cam followers for engagement with the cam and supported pivotably, a swing block attached to the pusher and connected to the first lever, and a second lever supported pivotably and connected to the swing block, the second lever forming parallel links in combination with the first lever through the swing block.

Preferably, for inputting the rotation of the drive shaft to the input shaft of the cam type index device to cause the index device to output its indexing operation from the output shaft thereof, the sorter further includes a clutch and a brake both mounted on the input shaft coaxially and operated in accordance with a sorting signal, and a pulley mounted to the clutch and connected to the drive shaft through a belt.

Preferably, the cam type index device causes the sub-screw to rotate once every time one indexing operation is performed by operation of the clutch and the brake based on the sorting signal.

Preferably, the cam type index device controls the rotation of the sub-screw so that on the basis of operation of the clutch and the brake the rotating motion of the sub-screw consists of a series of stop section, accelerating section, uniform speed section, decelerating section, and stop section.

Preferably, the helical grooves of the main screw are designed such that the pitch thereof ahead of the annular groove portion, prior to sorting, is a little larger than the size of each-product to be sorted and, just before and after the annular groove portion, it is still larger.

Preferably the helical grooves of the sub-screw are designed such that the pitch of the initial groove adjacent to the main screw is set in conformity with the speed of delivery operation of the delivery means.

Preferably, a rotational angle displacement of the sub-screw is set equal to a delivery displacement of the delivery means.

Preferably the rotating speed of the sub-screw is set equal to the delivery speed of the delivery means.

Preferably, the feed operation of the main screw after passing the annular groove portion is set slower than that before the annular groove portion in accordance with the pitch of the helical grooves thereof.

Preferably, the feed operation of the sub-screw is set slower after a single rotation to receive a product to be sorted in accordance with the pitch of the helical grooves thereof.

Preferably, for the transfer of a continuous rotation of the drive shaft to the main screw, the sorter is provided with a rotating shaft disposed through the axis of the main screw, a pulley mounted on the rotating shaft, a pulley mounted on the drive shaft, and a belt entrained on both the pulleys.

Preferably, for the transfer of rotation outputted from the output shaft of the cam type index device to the sub-screw to rotate the sub-screw, the sorter is provided with a rotating shaft disposed through the axis of the sub-screw, a pulley mounted on the rotating shaft, a pulley mounted on the output shaft, and a belt entrained on both the pulleys.

Preferably, the cam is constituted by a roller gear cam mechanism

Preferably, the main screw is formed long in its axial direction, a plurality of such sub-screws as mentioned above are arranged sideways of the main screw at appropriate intervals, and a set of the delivery means and the interlocking mechanism, which are driven by the drive shaft, is provided independently for each of the sub-screw to deliver the products to be sorted to the sub-screw respectively.

According to the sorter in one aspect of the present invention constructed as above, the main screw which is rotated continuously comes into engagement with products to be sorted at its helical grooves and convey the products by the feeding motion of the helical grooves while arranging the products in order. The products being conveyed are each stopped temporarily at the position of the annular groove portion formed in the main screw. At the position of the annular groove portion is disposed a rotatable sub-screw located near the main screw and is also disposed a delivery means. The delivery motion of the delivery means and the rotating motion of the sub-screw are synchronized with each other by the interlocking mechanism. The delivery means performs its delivery motion for the product to be sorted staying at the position of the annular groove portion and at the same time the sub-screw rotates to receive the product, whereby the product to be sorted is delivered to the sub-screw smoothly from the main screw, comes into engagement with the helical grooves of the sub-screw, and is thereby conveyed while being arranged in order.

Even if the main screw and the sub-screw both used for the conveyance of products are rotated at a high speed, they rotate stably and hence the products are conveyed stably at a high speed. This stable conveyance of the products is ensured because the helical grooves of the screws are sure to be engaged with the products in one-to-one correspondence.

In such firmly engaged state of the helical grooves with the products, the products are partitioned while being conveyed by the screws. Accordingly, there is no fear of collision of the products with each other. Besides, since the force applied to the products is only a unidirectional force acting in the conveyance direction from the helical grooves, the products are conveyed in one direction in a steadily stable state.

Moreover, before and after the annular groove portion formed in the main screw, a continuous feed of the products is ensured by the helical grooves, and at the position of the annular groove portion is set a stop period in which each product can be stopped temporarily. During this stop period the product staying in the annular groove portion is sent out by the delivery means. In this way the products to be sorted can be sorted stably with strict correctness and reliability.

Further, since the rotating motion of the sub-screw is performed in synchronism with the delivery motion of the delivery means by the interlocking mechanism, the products to be sorted, which are sent out from the main screw, are sure to be received in the sub-screw.

According to the sorter in another aspect of the present invention, constructed as above, the interlocking mechanism for interlocking the delivery motion of the delivery means with the rotating motion of the sub-screw utilizes the continuous rotation of the drive shaft which continuously rotates the main screw, and the above two motions are interlocked with each other by rotation of the input shaft of the cam type index device to which the rotation of the drive shaft is inputted. More specifically, the continuous rotation of the drive shaft is inputted interruptably to the input shaft of the cam type index device. Upon coupling of the drive shaft and the input shaft, that is, upon occurrence of necessity to operate the delivery means and the sub-screw, the input shaft is rotated by the drive shaft. Upon rotation of the input shaft, an intermittent rotation for controlling the rotating motion of the sub-screw is outputted from the output shaft of the cam type index device. At the same time, the cam provided on the input shaft also rotates and a delivery motion is transferred to the delivery means from the cam. Consequently, the delivery means performs the delivery motion and at the same time the sub-screw performs its rotating motion, which motions are synchronized with each other.

Especially, since the cam and the cam type index device superior in high-speed stability and high in positional accuracy are used as the interlocking mechanism, the delivery means and the sub-screw can perform a quick and sure sorting operation matching the performance of high-speed conveyance attained by the screws.

Further, all of the main screw and the interlocking mechanism, as well as the sub-screw and the delivery means, are driven by the rotation of a single drive shaft, and thus the main and sub screws and the delivery means are always synchronized at any operating speed, or at any rotating speed of the drive shaft.

According to the sorter in a further aspect of the present invention, as constructed above, since each of the pitches of helical grooves on the discharge end side of the main screw and that of the sub-screw is set almost equal to the size of each product, the products approach one another automatically without leaving any clearance when sent out from each screw. Thus there no longer is any fear of collision of the products upon disengagement of the helical grooves from the products.

BEST MODE FOR CARRYING OUT THE INVENTION

Embodiments of the present invention will be described in detail hereinafter with reference to the accompanying drawings. FIGS. 1 to 7 illustrate a sorter according to an embodiment of the present invention.

The sorter of this embodiment basically comprises a main screw 30 which has helical grooves 30a for engagement with products 14 to be sorted and which is rotated continuously to arrange in order and convey the products 14; an annular groove portion 30d formed between and in series with adjacent helical grooves 30a of the main screw 30 to stop each product 14 which is conveyed by the main screw 30; a rotatable sub-screw 32 located near the main screw 30 at the position of the annular groove portion 30d thereof, the sub-screw 32 being formed with helical grooves 32a for engagement with the products 14 to arrange in order and convey the products 14; a pusher 34 as delivery means disposed at the position of the annular groove portion 30d to deliver each product 14 from the annular groove portion 30d of the main screw 30 to either one of the helical grooves 32a of the sub-screw 32; and an interlocking mechanism for synchronizing the delivery motion of the pusher 34 and the rotating motion of the sub-screw 32 with each other.

The interlocking mechanism comprises a cam type index device 40 and a cam 46. The cam type index device. 40 has an input shaft 40a and an output shaft 40b. A continuous rotation of a drive shaft 36 for continuously rotating the main screw 30 is inputted to the input shaft 40a in an interruptible manner to rotate the input shaft 40a. Upon this interrupted rotation of the input shaft 40a, every intermittent rotating motion is outputted from the output shaft 40b to control the rotation of the sub-screw 32. The cam 46 is mounted on the input shaft 40a of the cam type index device 40 and outputs a delivery motion to the pusher 34 with the intermittent rotation of the input shaft 40a.

The helical grooves 30a on the discharge end portion of the main screw 30 are spaced each other at a pitch almost equal to the size of each product 14 to be sorted.

Likewise, the helical grooves 32a on the discharge end portion of the sub-screw 32 are spaced each other at a pitch almost equal to the size of each product 14 to be sorted.

Figure 1:
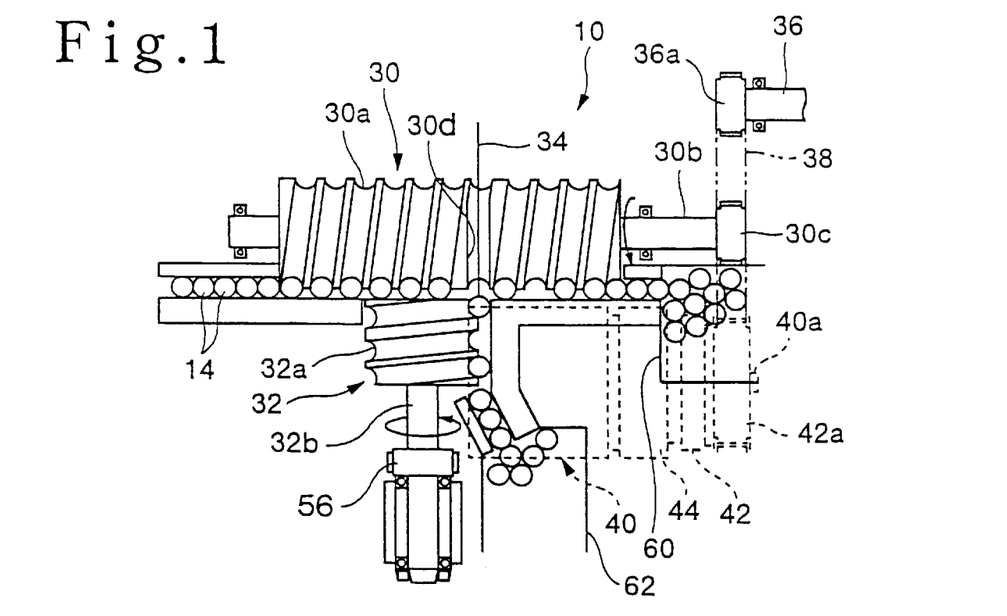
FIG. 1 is a plan view of a sorter according to an embodiment of the present invention.
Figure 2:
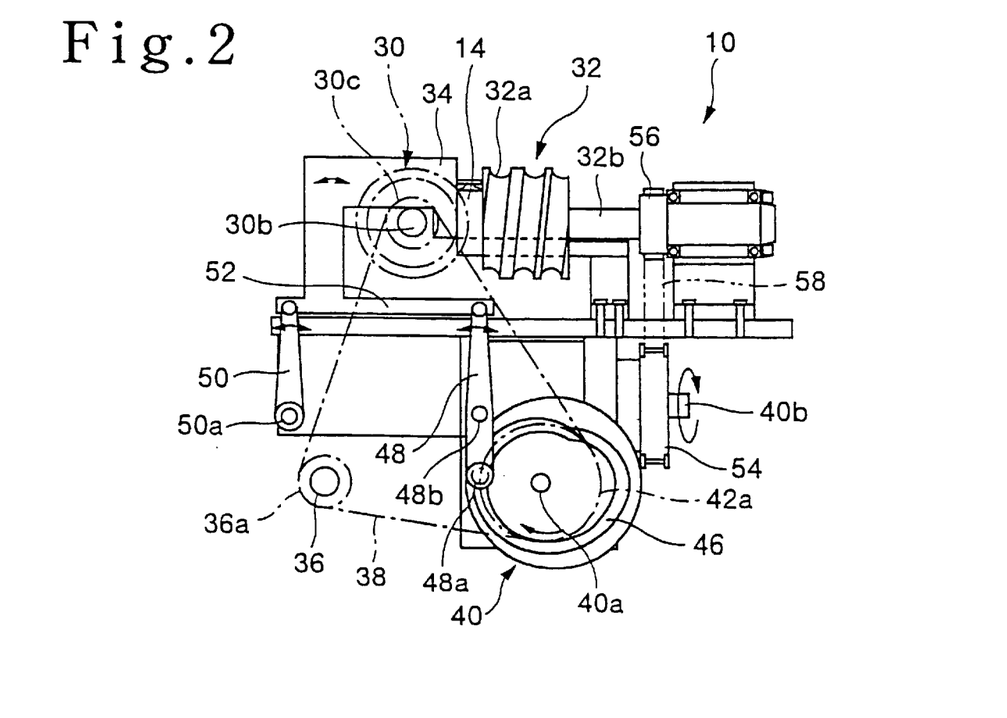
FIG. 2 is a side view of the sorter.
Figure 3:
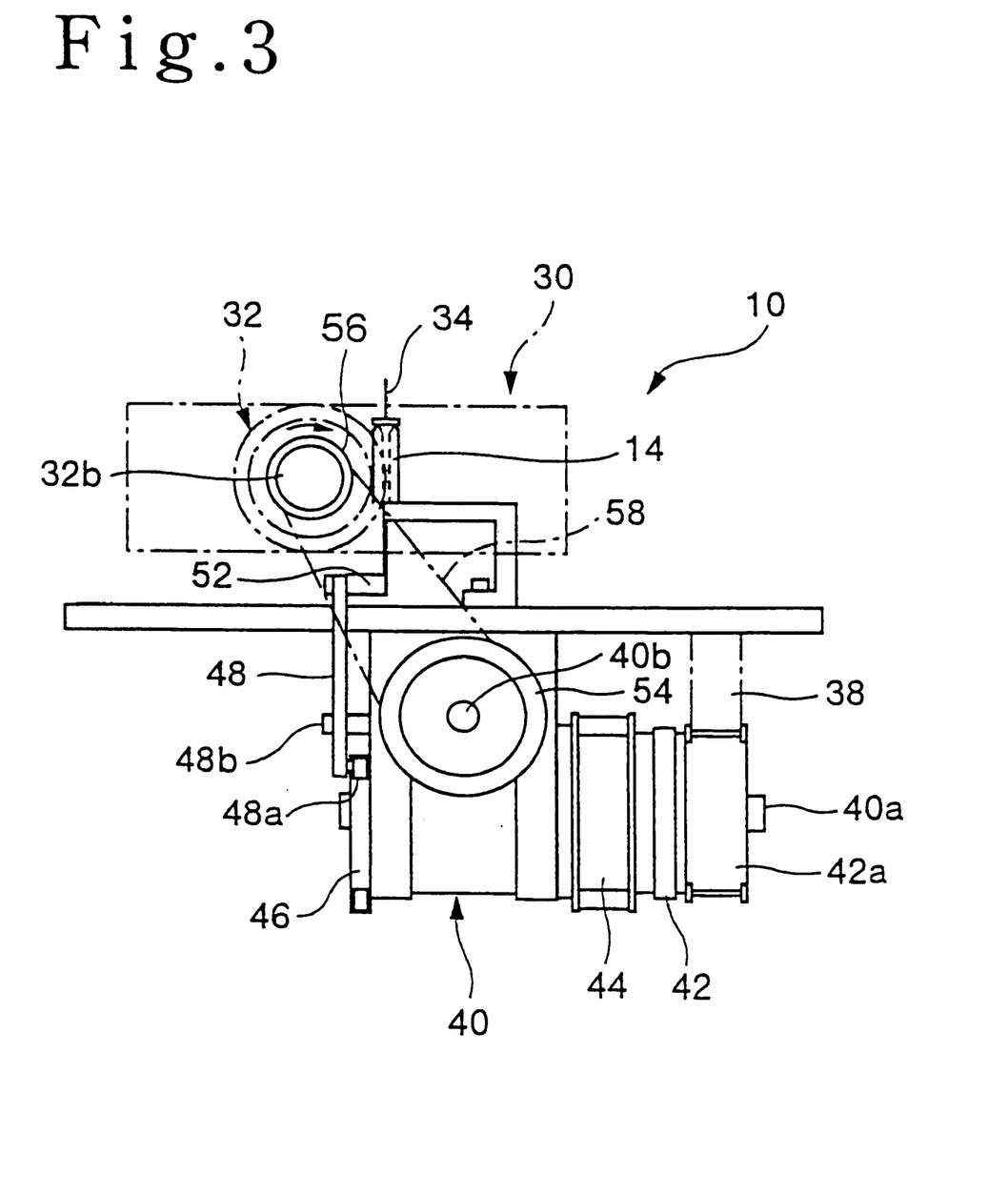
FIG. 3 is a front view of the sorter.

The sorter 10 of this embodiment is constituted as shown in FIGS. 1 to 3. The sorter 10 is, for instances applied to an inspection apparatus 12 shown in FIG. 4. The inspection apparatus 12 is equipped with inspection devices, including a CCD camera 22, to inspect the to-be-sorted products 14 optically. The inspection apparatus 12 comprises an annular rotary table 16 which conveys the products 14 to be sorted under rotation and an inspection device mounting table 18 located both of inside and outside the rotary table 16. On the inspection device mounting table 18 are mounted an electric light 20 and a CCD camera 22 oppositely to each other between which the products 14 on the rotary table 16 are conveyed.

Figure 4:
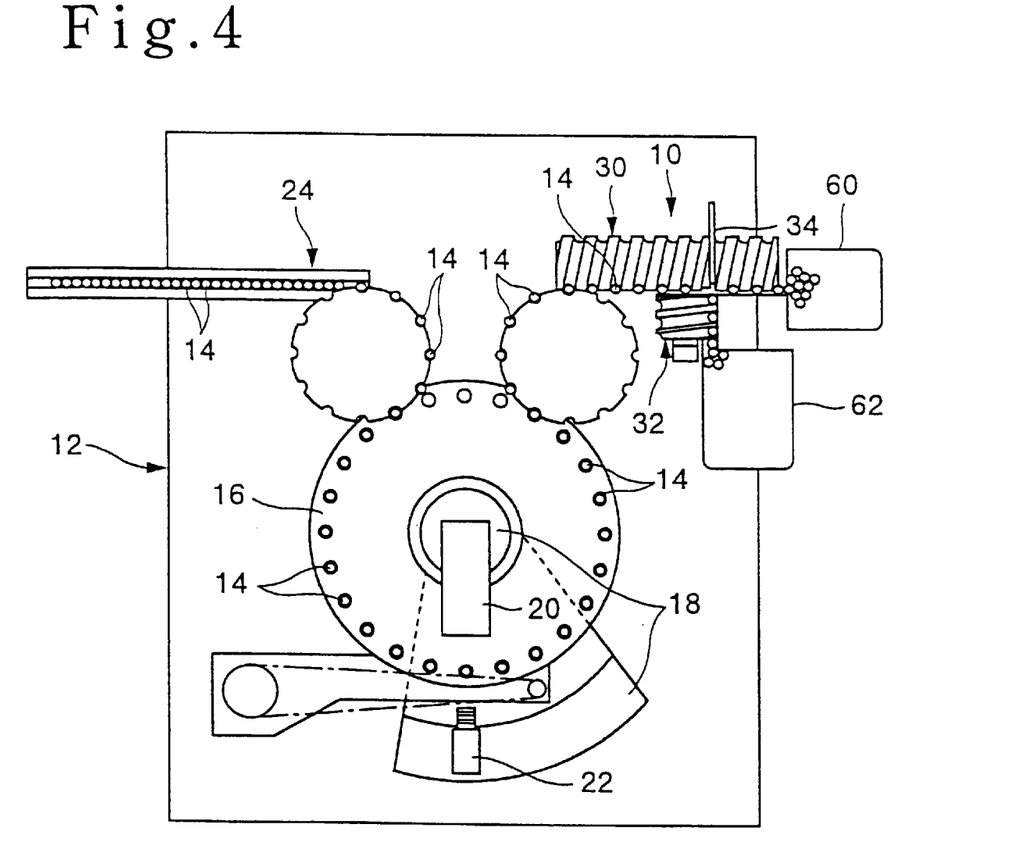
FIG. 4 is a plan view showing an example of an inspection apparatus in which the sorter of the invention is used.
Figure 5:
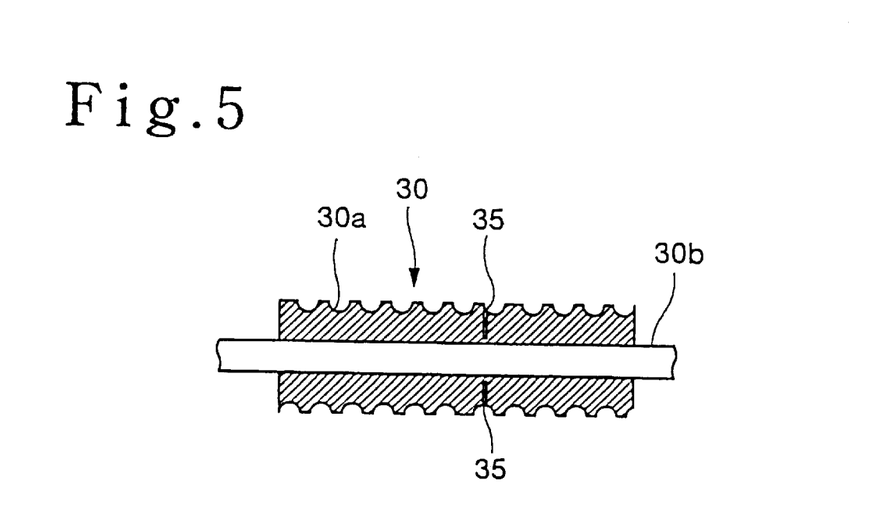
FIG. 5 is a sectional view of a main screw used in the sorter.
Figure 6:
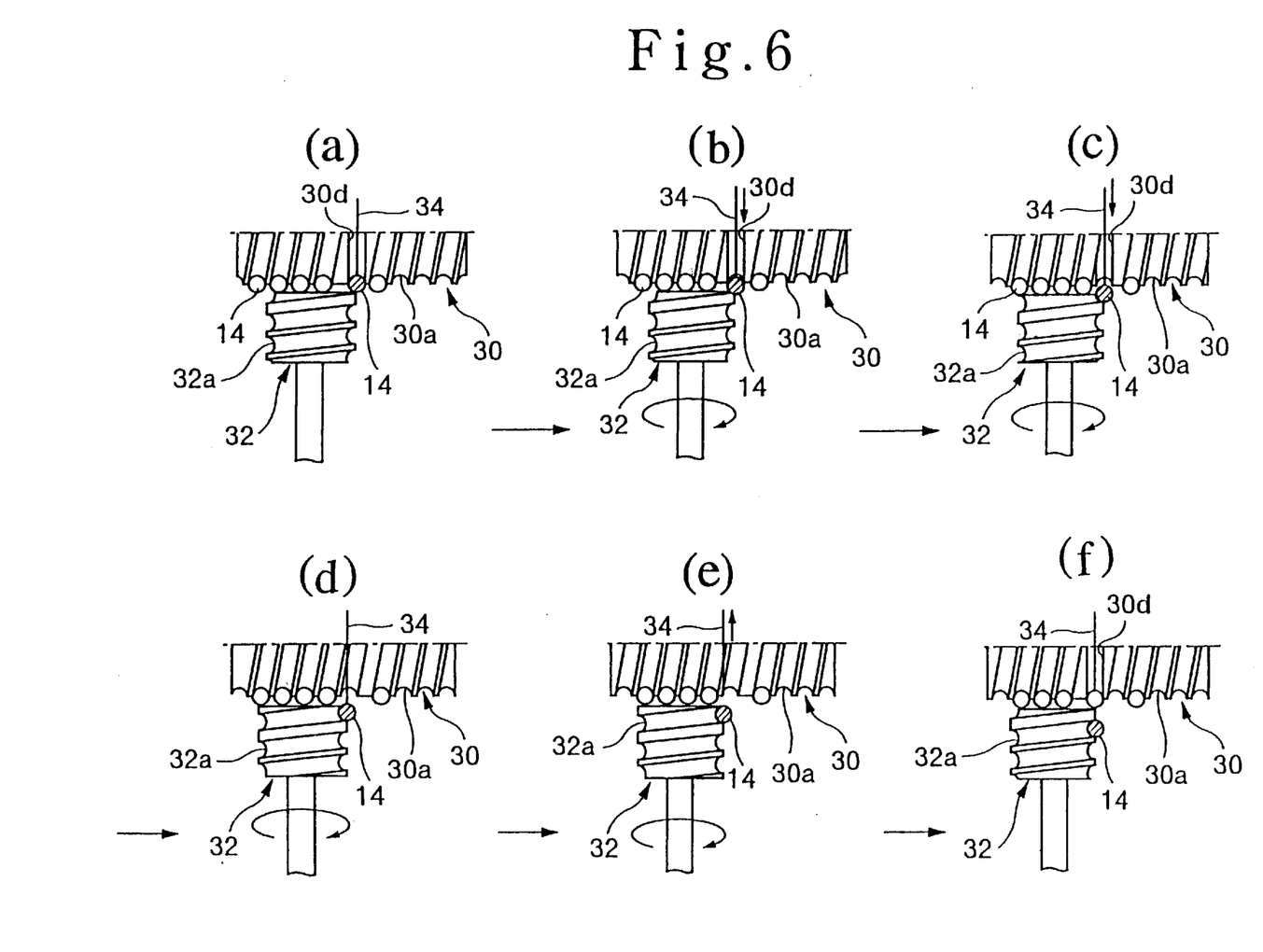
FIG. 6 is an explanatory view showing successively in order, operations for the delivery of products to be sorted from the main screw to a sub-screw in the sorter.

The rotary table 16 continues to rotate at a constant speed, and the products 14 to be sorted, which are fed successively from a feed line 24, are taken in onto the rotary table 16. On the other hand, the inspection device-mounting table 18 is reciprocated pivotally. At an advance path of the pivotal reciprocation the table 18 pivotally moves in synchronism with the rotary table 16, while at a return path of the pivotal reciprocation the table 18 returns quickly to its initial position. When the inspection device mounting table 18 rotates in synchronism with rotation of the rotary table 16 with the products 14 carried thereon, each product 14 is photographed with the CCD camera 22 by utilizing the light radiated from the electric light 20 to check the appearance of the product 14 or the mixing of any foreign matter therein. The product 14 thus checked is carried out from the rotary table 16. In this case, the sorter 10 is disposed in the portion where the product 14 is carried out from the rotary table 16.

On the basis of the results of inspection made by the inspection apparatus 12 the sorter 10 sorts the products 14 into non-defective products and defective products.

The sorter 10 generally comprises the main screw 30 formed with the helical grooves 30a for engagement with the products 14 to be sorted, the main screw 30 being rotated to axially convey the products 14 in an engaged state with the helical grooves 30a, the rotatable sub-screw 32 disposed perpendicularly to the main screw 30 at the position of halfway thereof, the sub-screw 30 being formed with the helical grooves 32a for engagement with the products 14, and a pusher 34 for pushing each product 14 being conveyed by the main screw 30 into a helical groove 32a of the sub-screw 32.

The pusher 34 is formed in the shape of a thin plate and it is inserted into a narrow slit 35 which is formed perpendicularly to the rotational axis of the main screw 30. When the pusher 34 is retreated it is not projected to the sub-screw 32 side of the annular groove portion 30d where the products 14 to be sorted are conveyed in an engaged state shown in FIG. 1, so that the products 14 are conveyed smoothly with rotation of the main screw 30. On the other hand when the pusher 34 is projected by a delivery operation, the product 14 staying in the annular groove portion 30d with the slit 35 formed therein is sent out to the sub-screw 32 side. The pusher 34 is operated in accordance with a sorting signal based on the result of inspection conducted for the product 14.

The rotation of the drive shaft 36 is transmitted to a rotating shaft 30b disposed along the axis of the main screw 30 through pulleys 30c and 36a and belt 38, whereby the main screw 30 is rotated continuously. The sub-screw 32 is rotated by the cam type index device 40 so as to rotate once for each indexing motion of the index device 40.

A clutch 42 and a brake 44 are mounted coaxially on one end portion of the input shaft 40a of the index device 40. A pulley 42a is attached to the clutch 42 and the belt 38 is entrained on the pulley 42a. The rotation of the drive shaft 36 is transmitted to the input shaft 40a by operation of the clutch 42. The clutch 42 and the brake 44 operate upon receipt of the foregoing sorting signal to rotate the input shaft 40a intermittently thereby causing the index device 40 to perform one indexing motion.

On the other end portion of the input shaft 40a is mounted a cam 46 for driving the pusher 34, as shown in FIG. 2. A cam follower 48a provided at the lower end of the first lever 48 is engaged with the cam 46. With rotation of the cam 46, the first lever 48 is moved pivotally about a pivot shaft 48b located at an intermediate position thereof.

Further, a second lever 50, which is pivotally movable about a pivot shaft 50a, is disposed at a position spaced horizontally from the first lever 48. A swing block 52 is mounted between the upper ends of the first and second levers 48 and 50 to constitute a parallel link. Therefore, with rotation of the cam 46, the swing block 52 swings in the horizontal direction. The pusher 34 is attached to the swing block 52 so that the pusher 34 can perform its delivery motion in the horizontal direction.

In the index device 40 is disposed an output shaft 40b perpendicularly to the input shaft 40a, and the rotation of the output shaft 40b is transmitted to a rotating shaft 32b of the sub-screw 32 via the pulleys 54 and 56 and the belt 58. In accordance with the sorting signal, the index device 40 performs one indexing motion, whereby the sub-screw 32 is rotated once.

FIGS. 6(a) to 6(f) illustrate, successively in order, in what manner each product 14 to be sorted is delivered from the main screw 30 to the sub-screw 32. First, as shown in FIG. 6(a), when a product 14 to be delivered to the sub-screw 32 has reached the position of the annular groove portion 30d, a sorting signal is issued. Then, as shown in FIG. 6(b), the pusher 34 starts its delivery motion, whereupon the sub-screw 32 also starts to rotate synchronously. As a result, the product 14 thus sent out is received in a helical groove 32a formed in the sub-screw 32, as shown in FIGS. 6(c), 6(d) and 6(e). Then, as shown in FIG. 6(f), the rotation of the sub-screw 32 is stopped after the sub-screw 32 has rotated once, and the pusher 34 reverts to its stand-by state. At this time, the product 14 is conveyed by only one pitch of the helical grooves 32a.

Ahead of the annular groove portion 30d, that is, before sorting the products 14, the helical grooves 30a of the main screw 30 are designed to have a pitch somewhat larger than the size of each product 14 to be sorted, and just before and after the annular groove portion 30d they are designed to have a still larger pitch.

On the sub-screw 32 side, its helical grooves 32a are formed so that the initial pitch at the inlet portion on the main screw 30 side, namely, at the delivery portion of each product 14, is large so as to match the speed of the delivery motion of the pusher 34.

Further, on the discharge end sides as terminal end portions of the main screw 30 and sub-screw 32, the helical grooves 30a and 32a are formed so as to have a pitch almost equal to the size of each product 14.

The sub-screw 32 is rotated by the index device 40 so that it rotates once at every receipt of a sorting signal. More specifically, the rotating motion of the sub-screw 32 by the index device 40 consists of stop section, accelerating section, uniform speed section, decelerating section, and stop section. This rotating motion of the sub-screw 32 is controlled by the clutch 42 and the brake 44. Since a stop section is provided with the index device 40, even if there occurs a slight error in the stop position of the input shaft 40a, there is no likelihood of a change in the stop position of the output shaft 40b, and thus it is possible to control a single rotation of the sub-screw 32 accurately.

Figure 7:
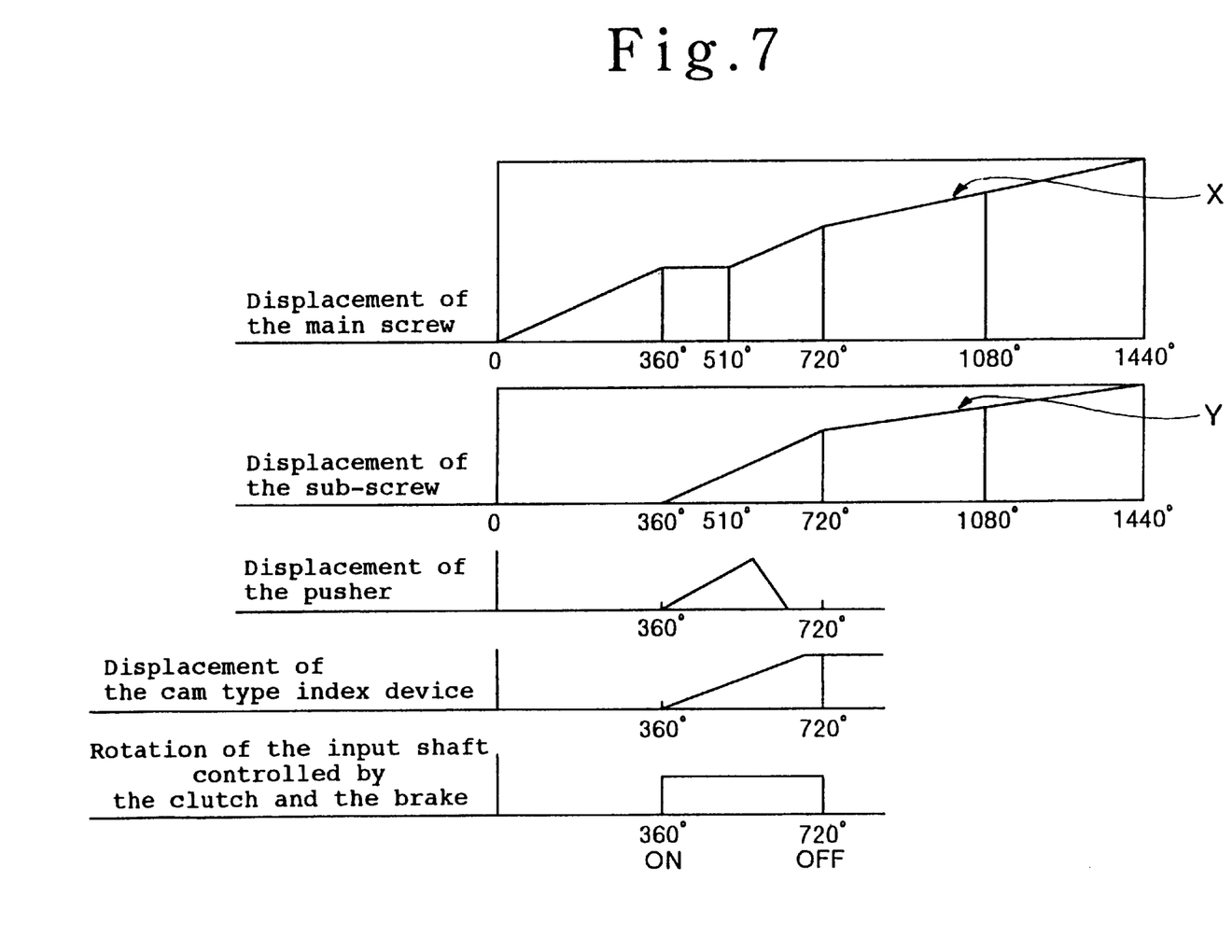
FIG. 7 is a time chart showing a series of operation timings of the sorter.

Referring now to FIG. 7, there is shown a time chart of displacements of the main screw 30, sub-screw 32, pusher 34 and cam type index device 40, and of rotation of the input shaft 40a of the cam type index device 40 controlled by the clutch 42 and the brake 44. The following description is now provided on the assumption that a product 14 to be delivered to the sub-screw 32 has reached the annular groove portion 30d at a time point of 360 degrees rotation of the main screw 30 from a certain time point. At the annular groove portion 30d of the main screw 30 there does not occur any displacement in the conveyance of the products 14 to be sorted (see the range of 360 degrees to 510 degrees). At this times the clutch 42 and the brake 44 are turned ON with a sorting signal, so that the input shaft 40a of the index device 40 is rotated. Upon rotation of the input shaft 40a, the pusher 34 is displaced a predetermined stroke to perform its delivery motion, and in synchronism with this delivery motion the cam type index device 40 also outputs a displacement to rotate the sub-screw 32 once (see the range of 360 degrees to 720 degrees) The rotational displacement of the sub-screw 32 is set at the same angle (speed) as the stroke displacement of the pusher 34. At the angle of 720 degrees corresponding to one rotation of the sub-screw 32, the clutch 42 and the brake 44 are turned OFF to cut off input to the input shaft 40a of the index device 40.

At such timings the sub-screw 32 and the pusher 34 are operated correspondingly to the rotation of the main screw 30. On the other hand, the feed motion of the main screw 30 is set relatively slow for the conveyance of the products 14 after passing the annular groove portion 30d (see X in FIG. 7). Also on the sub-screw 32, a quick feed is attained in one rotation thereof to receive the products 14 to be sorted and a slow feed is conducted for the subsequent conveyance of the products 14 to be received (see Y in FIG. 7).

In the sorter 10, a first storage portion 60 is provided at the terminal end in the conveyance direction of the main screw 30, while a second storage portion 62 is provided at the terminal end in the conveyance direction of the sub-screw 32. In the absence of a sorting signal, the products 14 are conveyed by the main screw 30 and are stored in the first storage portion 60, while when the pusher 34 operates upon issuance of a sorting signal and a product 14 to be sorted is sent out to the sub-screw 32, the product 14 is conveyed by the sub-screw 32 and is stored in the second storage portion 62.

In the sorter 10 of this embodiment constructed as above, the products 14 to be sorted after inspection by the inspection apparatus 12 are fed to the main screw 30 and are conveyed successively in engagement with the helical grooves 30a of the main screw 30. When a product 14 to be sorted reaches the annular groove portion 30d during successive conveyance of the products 14 by the main screw 30, a sorting signal is issued to operate the pusher 34, whereby the product 14 is sent out from the annular groove portion 30d of the main screw 30 to a helical groove 32a formed in the sub-screw 32. In synchronism with this delivery motion, the sub-screw 32 rotates and the product 14 is received into and engaged with the helical groove 32a. Thereafter, the product 14 is conveyed. Thus, the product 14 received onto the sub-screw 32 is then conveyed along the conveyance path of the sub-screw 32 different from that of the main screw 30 and is thereby stored into the second storage portion 62.

The products 14 to be sorted are thus conveyed smoothly by the main screw 30 and the sub-screw 32 in engagement with the helical grooves 30a and 32a of the main and sub screws 30 and 32, respectively. Since the pitches of the helical grooves 30a and 32a are adjusted appropriately, it is possible to prevent mutual collision of the products 14 and hence possible to effect a high-speed conveyance of the products 14 by both main screw 30 and sub-screw 32.

In the sorter 10 of this embodiment, the main screw 30 and the sub-screw 32 can convey the products 14 surely and at a high speed by their helical grooves 30a and 32a. As to the pusher 34, its high-speed performance and positional accuracy can be improved by using a cam curve based on the cam 46.

Besides, by using the cam type index device 40 for the intermittent rotation of the sub-screw 32 and by adopting a roller gear cam mechanism for the cam 46, it becomes possible to further ensure a high-speed stability for the sorter 10.

For imparting rotation to the input shaft 40a of the cam type index device 40 immediately after receipt of a sorting signal, it is desirable that both of the clutch 42 and the brake 44 are of a high response type.

Further, since the sorter 10 is constructed so that a series of motions are obtained from a single drive shaft 36, it is possible to always synchronize the main screw 30, the sub-screw 32 and the pusher 34 for any of various operating speeds. There is no fear of occurrence of a timing error. Consequently, by using the sorter 10 of this embodiment, the conventional sorting ability of about 100 to 200 products per minute can be enhanced to about 200 to 400 products per minute, which is about twice the conventional ability.

Moreover, since the pitch of the helical grooves 30a and 32a in the vicinity of the discharge ends of the main screw 30 and sub-screw 32 is set at a value close to the size of each product 14 to be sorted, it is possible to prevent mutual collision of the products 14 and hence possible to decrease damage to the products 14.

In the sorter 10 of this embodiment, moreover, since the drive system for the main screw 30, the sub-screw 32 and the pusher 34 is constituted by a mechanical system, including the cam type index device 40, a series of operations can be done with a high accuracy.

Additionally, since the sorter 10 is constructed so that the products 14 to be sorted are sure to be present in either the main screw 30 or the sub-screw 32, there is no fear of mixing from or to any other portion. Besides, at the delivery portion from the main screw 30 to the sub-screw 32, the operation of the pusher 34 and that of the sub-screw 32 can be ensured by a pivotal drive of the cam 46 and a drive of the cam type index device 40. Therefore, it is possible to surely prevent each product 14 from stopping at the delivery portion between the main screw 30 and the sub-screw 32, and the product 14 can be distributed correctly to either the main screw 30 or the sub-screw 32.

Figure 8:
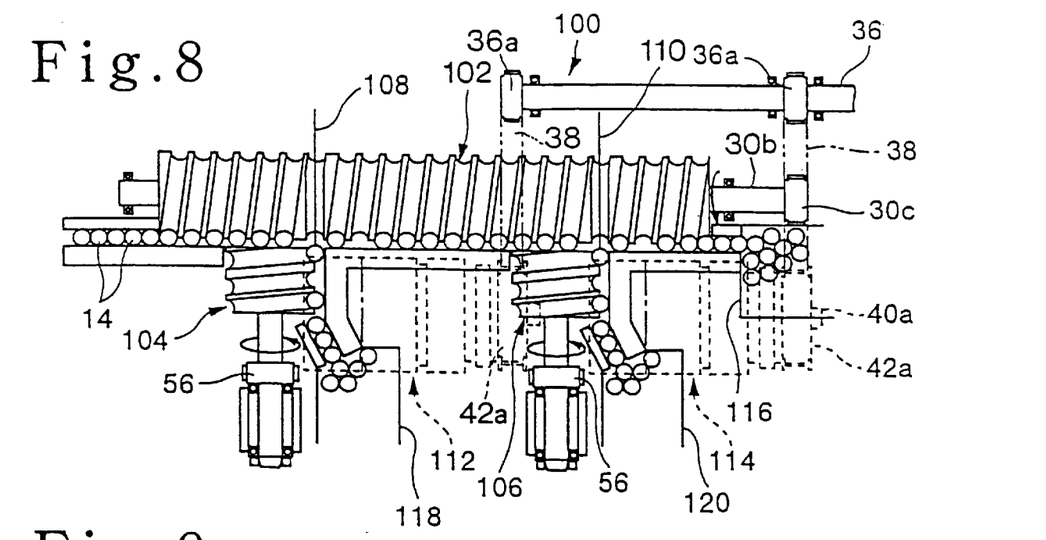
FIG. 8 is a plan view of a sorter according to another embodiment of the present invention.

FIG. 8 is a plan view of a sorter according to another embodiment of the present invention In this embodiment, a plurality of sorting portions for the products 14 to be sorted are provided. The same components as in the previous embodiment are indicated by the same reference numerals as in the previous embodiment to omit repeated explanations.

In the sorter of this embodiment, indicated at 100, an axially long main screw 102 is used, and a first sub-screw 104 and a second sub-screw 106 are disposed at an appropriate interval sideways of the main screw 102 so that products 14 to be sorted can be delivered to the first and second sub-screws 104 and 106. A first pusher 108 and a second pusher 110 are provided correspondingly to the first and second sub-screws 104 and 106, respectively.

The first and second sub-screws 104 and 106 are respectively provided with a series of drive mechanisms, including cam type index devices 112 and 114 each equipped with a clutch and a brake, and cams for actuating the first and second pushers 108 and 110, in an independent manner. The main screw 102 and the first and second sub-screws 104 and 106 are respectively provided with storage portions 116, 118 and 120 for the storage of products 14 distributed to the respective conveyance paths.

Thus, in this embodiment it is possible to sort the products 14 into three groups. The number of the sub-screws is not limited to two. Three or more sub-screws may be used. By using n number of sub-screws it becomes possible to sort the products 14 into n+1 groups. Thus, while the products 14 are conveyed by a single main screw 102, they can be subdivided according to items of defective products, or non-defective products can be classified according to grades. By such a simple construction, the sorter 100 can exhibit a high level of functions.

As set forth above, according to the sorter in one aspect of the present invention the helical grooves of the main screw which is rotated continuously come into engagement with products to be sorted and feed the products while arranging them in order. Then, at the position of an annular groove portion formed in such a helical groove the products being conveyed are each stopped temporarily. Further at the said annular groove position there are disposed a rotatable sub-screw located near the main screw, as well as a delivery means. The delivery motion of this delivery means and the rotating motion of the sub-screw are synchronized with each other by an interlocking mechanism. Accordingly, when a product staying at the annular groove position is sent out by the delivery motion of the delivery means, the rotating motion synchronized with the delivery motion permits the product to be received by the sub-screw. In this way the product can be sent out smoothly from the main screw to the sub-screw and thereafter can be conveyed while being arranged in order in engagement with the helical grooves of the sub-screw.

In particular, since the main screw and the sub-screw which rotate stably even at a high speed are used for the conveyance of products, the products can be conveyed stably at a high speed and thus it is possible to attain high speed and high efficiency of the sorting work. Besides, since their helical grooves of the main screw and the sub-screw are sure to engage the products on a one-to-one basis, it is possible to convey the products in a stable manner. Even if the products are conveyed at a high speed, it is possible to index the position of each product accurately and thus an accurate and reliable sorting work can be ensured.

Moreover, in the conveyance using the screws, the helical grooves are sure to independently engage the products one by one, thereby partitioning the products, so there is no fear of mutual collision of the products. Besides, an external force applied to each product is only a unidirectional force acting in the conveyance direction from the associated helical groove. Accordingly, each product can be conveyed in one direction in a steadily stable state while preventing the exertion of any excessive force on the product which would cause damage of the product.

Further, since an annular groove portion is formed in the main screw and a stop period is set for temporary stop of each product to be sorted at the position of the annular groove portion while ensuring continuous feed of the product by the associated helical groove just before and after the annular groove portion, and since the product to be sorted is sent out in this stop period by the delivery means, the sorting of products can be effected stably with strict correctness and reliability while ensuring the continuous and high-speed conveyance of products.

In this connections since the rotation of the sub-screw is synchronized with the delivery motion of the delivery means by the interlocking mechanism, each product being sent out from the main screw can be surely received onto the sub-screw and thus both delivery and receipt of each product from the main screw to the sub-screw can be done in a sure and smooth manner, whereby a highly efficient high-speed sorting can be attained.

According to the sorter in another aspect of the present invention, constructed as above, the continuous rotation of the drive shaft is inputted interruptably to the input shaft of the cam type index device, and upon coupling of both drive shaft and input shaft by a clutch, that is, upon occurrence of necessity to operate both the delivery means and the sub-screw, the input shaft is rotated by the drive shaft. With this rotation of the input shaft, an intermittent rotation for controlling the rotation of the sub-screw is outputted from the output shaft of the cam type index device, and at the same time a delivery motion is outputted to the delivery means from a cam disposed on the input shaft. Consequently, the rotation of the sub-screw can be synchronized with the delivery motion of the delivery means.

In particular, since a cam and a cam type index device both exhibiting a high-speed stability and capable of performing a positive motion with a high positioning accuracy are used as constituents of the interlocking mechanism, it is possible to let the delivery means and the sub-screw perform a quick and positive sorting motion matching the performance of high-speed conveyance attained by the screws. Consequently, the foregoing delivery and receipt of each product to be sorted from the main screw to the sub-screw can be done more accurately and smoothly. Also from this point it is possible to attain a highly efficient high-speed sorting.

Since the main screw and the interlocking mechanism further, the sub-screw and the delivery means are all driven with a single drive shaft, the main and sub screws and the delivery means can always be synchronized for any of various operating speeds, namely, for any of various rotating speeds of the drive shaft. Consequently, the products can be sorted with strict accuracy and reliability without causing any error in operation timing.

According to the sorter in a further aspect of the present invention, constructed as above, since each of the pitches of the helical grooves on the discharge end sides of the main and sub screws are almost equal to the size of each product, the products can be drawn near automatically without clearance when discharged from the main and sub screws. Thus, when the helical grooves are disengaged from the products, it is possible to prevent violent collision of the products with one another and hence prevent damage of the products being carried out.

We claim:

1. A sorter comprising:
    a drive shaft;
    a main screw which is rotated continuously by said drive shaft to arrange in order and convey products to be sorted, said main screw having helical grooves for engagement with the products to be sorted;
    an annular groove portion for stopping therein each of the to-be-sorted products being conveyed, said annular groove portion being formed between said helical grooves of said main screw in series with the helical grooves;
    a rotatable sub-screw located near said main screw at the position of said annular groove portion, said sub-screw being formed with helical grooves for engagement with the products to be sorted to arrange in order and convey the products;
    a delivery means disposed at a position of said annular groove portion to deliver the products to be sorted from said main screw to said sub-screw; and
    an interlocking mechanism to which is inputted the rotation of said drive shaft and which synchronizes the delivery motion of said delivery means with the rotation of said sub-screw.

2. A sorter according to claim 1, wherein said helical grooves of said main screw are designed such that the pitch thereof ahead of said annular groove portion, prior to sorting, is a little larger than the size of each said product to be sorted and, just before and after the annular groove portion, it is still larger.

3. A sorter according to claim 1, wherein said helical grooves of said sub-screw are designed such that the pitch of the initial groove adjacent to said main screw is set in conformity with the speed of delivery operation of said delivery means.

4. A sorter according to claim 1, wherein a rotational angular displacement of said sub-screw is set equal to a linear delivery displacement of said delivery means.

5. A sorter according to claim 1, wherein the rotating speed of said sub-screw is set equal to the delivery speed of said delivery means.

6. A sorter according to claim 1, wherein, on the discharge end side of said main screw and that of said sub-screw, said helical grooves are spaced at a pitch almost equal to the size of each product to be sorted.

7. A sorter according to claim 1, wherein the feed operation of said main screw after passing said annular groove portion is set slower than that before said annular groove portion in accordance with the pitch of the helical grooves thereof.

8. A sorter according to claim 1, wherein the feed operation of said sub-screw is set slower after a single rotation to receive a product to be sorted in accordance with the pitch of the helical grooves thereof.

9. A sorter according to claim 1, which, for the transfer of a continuous rotation of said drive shaft to said main screw, further includes:

a rotating shaft disposed through the axis of the main screw;

a pulley mounted on said rotating shaft;

a pulley mounted on said drive shaft; and a belt entrained on both said pulleys.

10. A sorter according to claim 1, wherein said main screw is formed long in its axial direction, a plurality of said sub-screws are arranged sideways of said main screw at appropriate intervals, and a set of said delivery means and said interlocking mechanism, which are driven by said drive shaft, is provided independently for each of said sub-screw to deliver the products to be sorted to said sub-screw respectively.

11. A sorter according to claim 1, wherein said interlocking mechanism comprises:

a cam type index device having an input shaft and an output shaft which are driven rotatably, with a continuous rotation of said drive shaft for rotating said main screw continuously being inputted to said input shaft interruptably, and with an intermittent rotation being outputted from said output shaft to control the rotation of said sub-screw; and a cam mounted on said input shaft of said cam type index device to output a delivery motion to said delivery means with rotation of the input shaft.

12. A sorter according to claim 11, which, for the transfer of rotation outputted from said output shaft of said cam type index device to said sub-screw to rotate the sub-screw, further includes:

a rotating shaft disposed through the axis of said sub-screw;

a pulley mounted on said rotating shaft;

a pulley-mounted on said output shaft; and a belt entrained on both said pulleys.

13. A sorter according to claim 11, wherein said cam is constituted by a roller gear cam mechanism.

14. A sorter according to claim 11, wherein said delivery means comprises:

a slit formed in said annular groove portion of said main screw, said slit having an opening facing said helical grooves of said sub-screw; and a pusher to advance and retreat into and from said slit in such a manner that when retreated from said slit the pusher is not projected to said annular groove portion, while when advanced into the slit the pusher is projected to the annular groove portion to push the to-be-sorted product located therein toward said sub-screw.

15. A sorter according to claim 14, which, for the transfer of an operating force to said pusher from said cam to reciprocate the pusher, further includes:

a first lever having cam followers for engagement with said cam and supported pivotably;

a swing block attached to said pusher and connected to said first lever; and a second lever supported pivotably and connected to said swing block, said second lever forming parallel links in combination with said first lever through the swing block.

16. A sorter according to claim 11, which, for inputting the rotation of said drive shaft to said input shaft of said cam type index device to cause the index device to output its indexing operation from said output shaft thereof, further includes:

a clutch and a brake both mounted on said input shaft coaxially and operated in accordance with a sorting signal; and a pulley mounted to said clutch and connected to said drive shaft through a belt.

17. A sorter according to claim 16, wherein said cam type index device causes said sub-screw to rotate once every time one indexing operation is performed by operation of said clutch and said brake based on said sorting signal.

18. A sorter according to claim 16, wherein said cam type index device controls the rotation of said sub-screw so that on the basis of operation of said clutch and said brake the rotating motion of the sub-screw consists of a series of stop section, accelerating section, uniform speed section, decelerating section, and stop section.

* * * * *